Figure 4:
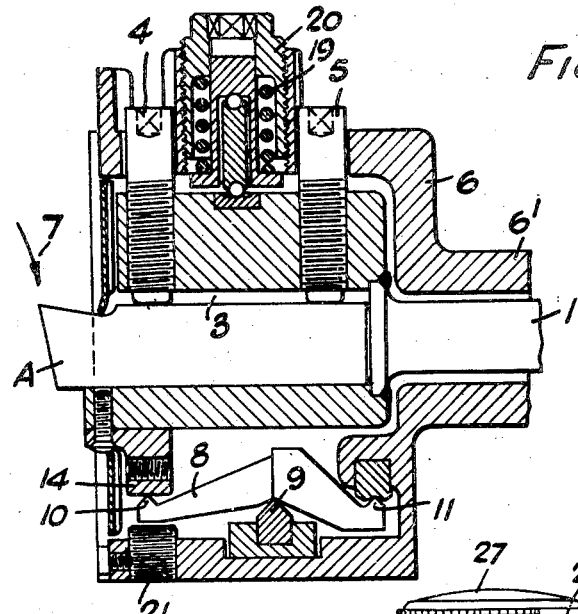

March 29, 1949. G. SCHLESINGER 2,465,757
APPARATUS FOR TESTING THE
MACHINEABILITY OF METALS
Filed June 17, 1946 2 Sheets-Sheet 1
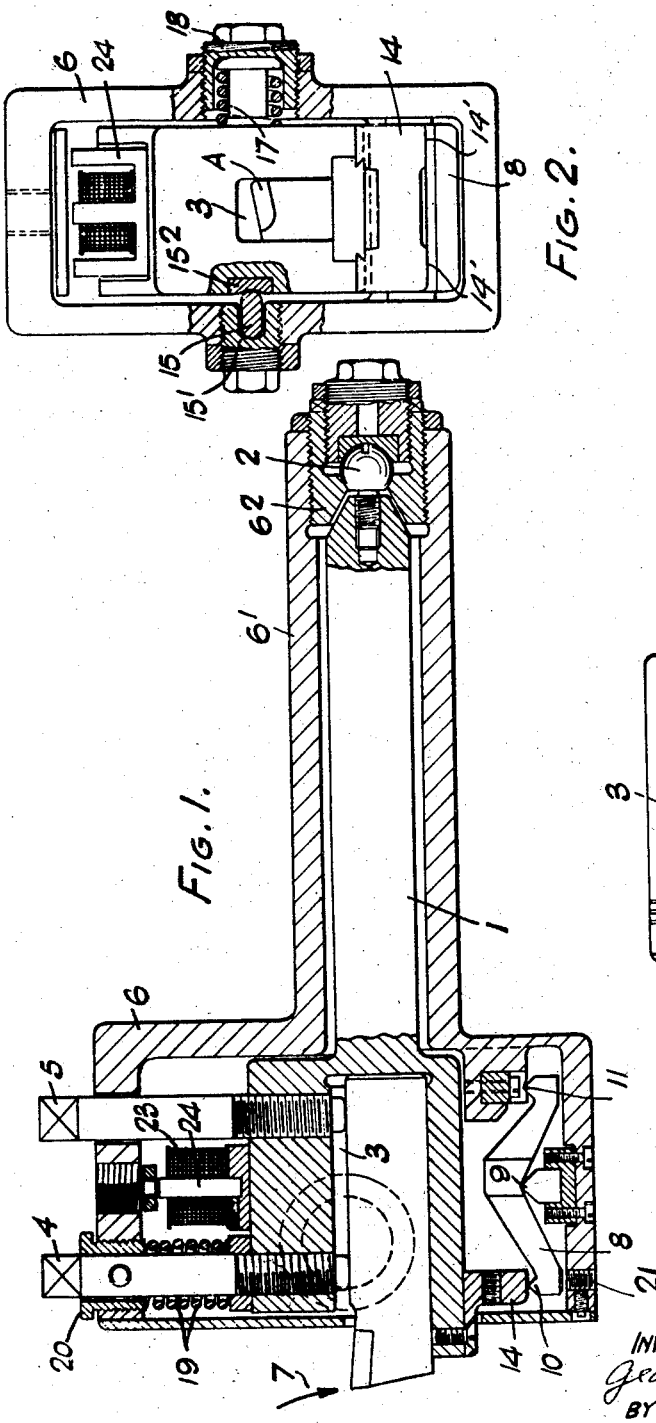
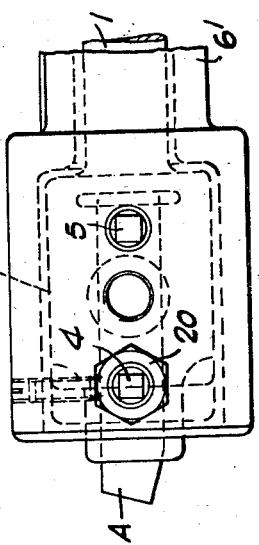
INVENTOR
Georg Schlesinger
BY Baldwin & Wight
ATTORNEYS.

March 29, 1949.    G. SCHLESINGER    2,465,757
APPARATUS FOR TESTING THE
MACHINEABILITY OF METALS Filed June 17, 1946    2 Sheets-Sheet 2

INVENTOR
Georg Schlesinger
BY Baldwin & Wight
ATTORNEYS.

Patented Mar. 29, 1949

2,465,757

UNITED STATES PATENT OFFICE 2,465,757

APPARATUS FOR TESTING THE MACHINE- ABILITY OF METALS

Georg Schlesinger, Loughborough, England

Application June 17, 1946, Serial No. 677,377
In Great Britain June 20, 1945

7 Claims. (Cl. 73—133)

This invention relates to the machining of metals by single point or edge cutting tools such as are employed in turning or planing operations. The importance of the machineability of a metal in modern production methods is well recognized.

One object of this invention is to provide an instrument by which the machineability of different metals can readily be ascertained and also to provide an instrument which while being robust and capable of general use in a workshop (as compared with use in a laboratory) shall at the same time afford considerable accuracy and sensitivity.

For practical purposes a completely satisfactory measure of the machineability of a metal can be obtained by measuring only the tangential cutting pressure exerted in making a cut; this term "tangential cutting pressure" is used in the sense in which it is now understood in the art of machining metals as being that pressure which is in the case of a turning operation tangential to the work and is in the case of a planing operation in line with the direction of feed, the force in a planing operation being thus equivalent to the tangential force in a turning operation on work of infinite radius.

Now the present invention is concerned with an instrument designed specifically to measure only the tangential cutting pressure and according to this invention there is provided an instrument comprising a support having a spherical surface on which is mounted a tool-holder which reacts under the cutting pressure, against the free end of a cantilever formed of resilient metal and anchored at its root end between two spaced knife edges on the support, and in addition the holder is constrained against movement in the direction of feed by a strut which extends in a direction normal to the tangential cutting pressure between the support and the tool holder and is free to rock about its ends, the holder being resiliently urged into engagement with the cantilever and the strut. With such an instrument, the deflection of the cantilever under the tangential component only of the cutting pressure is utilized as a measure of that pressure and arrangements are made to use that deflection to obtain an indication related to the tangential cutting pressure exerted in making a cut.

Preferably, the holder acts on the free end of the cantilever through a further knife edge arrangement, and it is preferred to dispose the three knife edges in a common plane extending in a direction normal (or sensibly so) to the line of action of the tangential cutting pressure.

Preferably also, the support is so formed as to provide a shank part by which the instrument can be clamped in the tool post of a machine tool so adapting the instrument for work-shop use to which end the nature of the construction of the instrument is well adapted.

The machineability factor of a metal is in accordance with this invention defined as the $$\frac{\text{tangential cutting pressure}}{\text{area of chip}}$$

this representing an index which can be assigned to the different metals; the volume of the chip is not taken into account since this is a function of cutting speed and of tool life and not of the quality of the penetrability of a metal.

The actual area selected for standardization of chip is not limited to any particular value so long always as the index of different metals is compared on the basis of the same chip area. A suitable value of chip area has been found to be .001 square inches=$\frac{1}{16}'' \times \frac{1}{64}''$.

Obviously, an important factor in measuring the machineability value is the standardization of the form i. e., cutting angles, nose radius and so on of the cutting tools. This can be ensured by employing jigs and it would be preferred to employ special jigs which will locate the tools at compound angles such that in one grinding operation two of the cutting angles of the tool are correctly formed. The jigs would be standardized in relation to the different classes of metals and obviously standardization of the jigs enables the machineability factor of different metals to be rendered universal.

The indicating means may comprise either an electrical device which is particularly adapted for remote transmission of the deflection of the bar or it may comprise a dial indicator or clock gauge which is directly operated by deflection of the bar so as to indicate on the instrument itself that deflection.

The tool holder is conveniently carried in a carrier having a shank which can be supported in the tool post of a machine tool so that the instrument is well adapted for use in the workshop.

Figure 5:
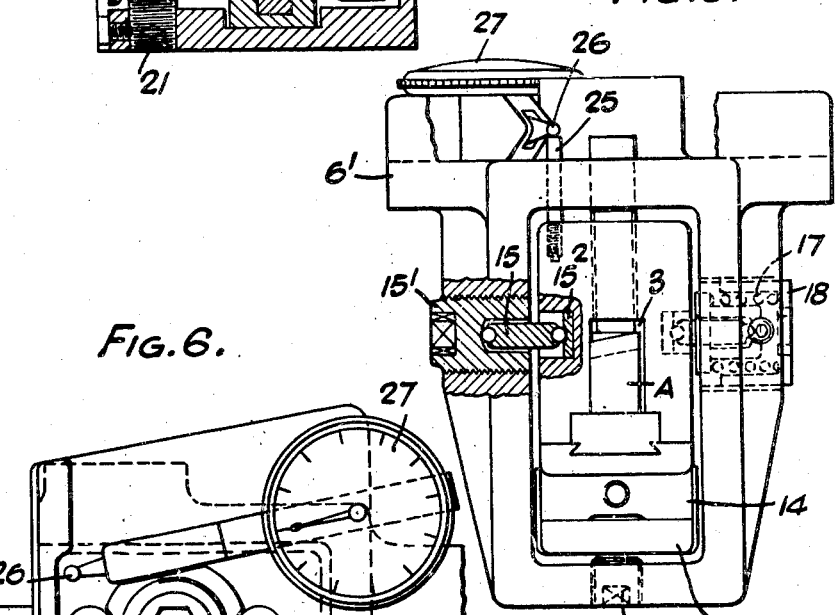
Figure 6:
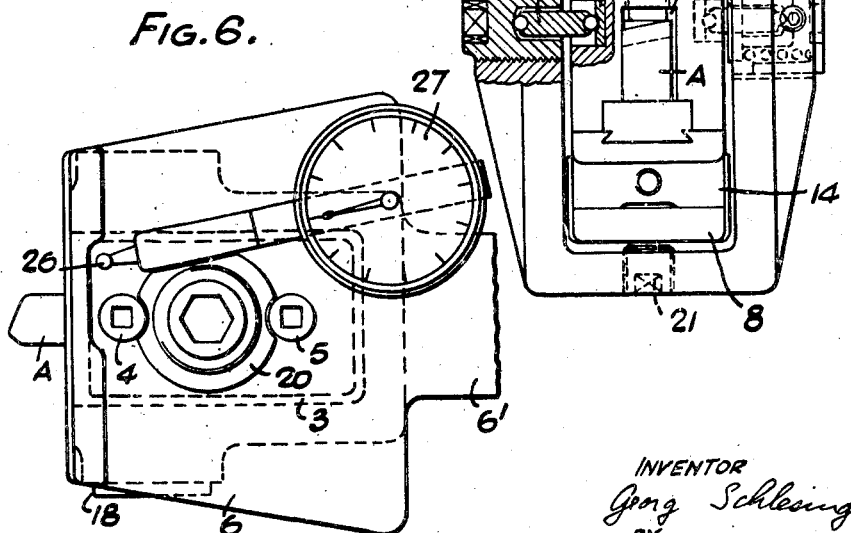

Two forms of instrument are illustrated in the accompanying drawings as applied to instruments for use in measuring tangential cutting pressures, in the drawings Figures 1, 2, and 3 are views of one construction, Figure 1 being a longitudinal sectional elevation, Figure 2 a transverse section and Figure 3 a plan view and Figures 4, 5 and 6 are views of a modified arrangement, Figure 4 being a longitudinal section, Figure 5 a front elevation and Figure 6 a plan view.

Reference will be made firstly to the arrangement of Figures 1-3. In these figures there is shown a tool holder 1 which is mounted for free universal movement on a ball 2 at its end remote from a tool receiving recess 3 in which a tool A is clamped by studs 4, 5 and ball mounting being afforded at the end of a shank 6' extending from a carrier 6: the loading on the ball is arranged for adjustment by a screw plug component 6², so that the ball can be preloaded to any desired degree. The shank 6' is arranged to be clamped in the tool post of any standard machine tool.

For the purpose of measuring only the tangential cutting pressure exerted on the tool A during a cutting operation (the line of action of the tangential pressure being indicated by the arrow 7) the tool holder is biased resiliently against movement under the cutting pressure: it is essential that the arrangement be such that the bias will not fluctuate that the response to movement of the tool will have substantially no lag and that the datum or zero point of the instrument will not change. In short it is essential that the arrangement be robust and serviceable, fitting it to be used primarily in workshops as distinct from laboratories. The arrangement shown in the drawings is particularly well suited to give these desired results: the movement of the tool holder 1 is resiliently restrained by a cantilever device comprising a metal bar 8 reacting on knife-edges 9, and 11 which are fixed and are carried by the carrier 6, the free end of the bar extending to a third knife-edge 10 bearing on a hardened and ground block 14 on the tool holder 1. As will most clearly be seen from Figure 2, the block 14 is formed with two "feet" 14' which are spaced apart about the longitudinal axis of the holder 1 as to provide in conjunction with a ball 2, a three point support for the holder. The formation of the bar 8 is such that the root end of the cantilever represented by that part between the knife-edges 9 and 11 is rigid for all practical purposes and the deflection of the cantilever takes place only at the outer end. Obviously the deflection will depend on the pressure exerted on the tool holder in making a cut and hence the deflection of the free end of the cantilever will be a function of the tangential cutting pressure.

It will be clear that the method of supporting the cantilever is such as to reduce friction and wear to the lowest possible value.

It is also to be observed that the operating edges of the three knife-edge components 9, 10 and 11 fall on the same straight line parallel with the tool holder. Thus the swivelling movement of the tool holder 1 is throughout its range of movement practically normal to that line so that sliding movement of the feet 14' on the knife edge 10 is substantially zero.

In the normal position of the tool holder 1, i. e. before a cutting operation, the cantilever is preloaded to ensure the elimination of backlash and provide an unvarying zero. The preloading is effected by a spring 19 which acts between the casing 6 and the holder 1 and is adjustable by a screwed sleeve 20.

For the purpose of limiting the deflection of the free end of the cantilever an adjustable stop 21 which will operate to prevent dangerous over loading of the instrument or more precisely of the cantilever, is employed.

As has been stated, the tool holder 1 is supported so as to be moved only in a sense corresponding to the direction of action of the tangential cutting pressure. For the purpose of laterally positioning the tool holder 1 without restraint in the desired movement struts 15 having rounded ends are interposed between an adjustable block 15' and hardened inserts 15² in the tool holder, itself biased by a spring 17 into engagement with the struts 15. These struts are as shown so disposed at right angles to the movement of the tool holder 1 under the cutting pressure so that the struts are free to rock and accommodate the movement of the holder 1 under the cutting action without imposing restraint. The force exerted by the spring 17 is adjustable by a screw cap 18.

In making a cut there is set up not only the tangential force, but also a second force backward (shank force) and a third force sideward (feed force). The shank force is directly taken by the ball 2 at the end of the shank and merely increases the specific pressure on this ball bearing. The feed force is taken by the strut 15 and the increased specific pressure on the ball is negligible and does not impede the vertical movement of the tool holder. Thus, of the various forces acting on the holder and causing it to move only the force acting in the direction normal to the surface of the plate 14 will be restrained by the bias of the cantilever plate, the deflection of this latter plate corresponding in direction and amount to the tangential component of the cutting pressure which it is desired alone to measure. The actions of the springs 17, 19 are such as to have no effect on the measurement of the tangential pressure.

The arrangement shown in Figures 1-3 is intended to afford an electrical response to the deflection of the cantilever. This is effected by varying the inductance of an electromagnet included in or controlling an electrical indicating circuit. To effect this, the tool holder 1 has secured to it the armature 23 of the electromagnet so that the movement of the tool holder varies the gap between the armature and the core 24 of the electromagnet. The parts are arranged so that the gap between the armature and the core is a minimum when the tool holder 1 is in its zero or unloaded position, thus providing adequate sensitivity for small as well as for heavy cutting forces.

Referring now to the modified arrangement shown in Figures 4, 5 and 6 the parts of which are given reference numerals corresponding to those of corresponding parts of Figures 1-3, this modification consists principally in employing a mechanical indicator to indicate the deflection of the cantilever.

The tool holder 1 has mounted on it a post 25 disposed in line with the usual operating arm 26 of a clock gauge 27 carried on the casing 6'. When the tool holder 1 is moved down about the ball 2 under load and against the reaction of the cantilever the post 25 will correspondingly move and hence the indicator 27 will indicate the controlled movement of the tool holder or in other words the deflection of the cantilever. The arrangement thus affords a direct reading and the dial indicator may be calibrated in terms of cutting pressure.

In the arrangement shown in Figures 4, 5 and 6 the cantilever form is slightly modified to increase the rigidity of the fixed part relative to the flexibility of the part to flex: the cantilever extension carrying the knife-edge 10 is formed of reduced cross section as compared with the remainder of the bar.

It will be noted that the mechanism is compact and that the shank is more or less centrally disposed of the carrier 6 so that the instrument is well adapted for use in standard machine tools, it having only small overhang and projection below the shank.

If desired the movement of the tool holder under cutting pressure may be recorded by a pen recorder and this can be effected either on the instrument itself or at a remote point when the electrical transmission arrangement is employed as is described with reference to Figures 1-3.

It may be noted that although in a cutting action other forces than that measured by the instrument of this invention are involved, the force which is measured is the most important and it has been found that for all practical purposes it is the only force which is required in determining the machineability of a metal.

The instrument of this invention can be used not only to enable the machineability of a metal to be ascertained but also to predict the life of different tool materials this being determined from the product of cutting pressure as measured by the instrument and the cutting speed at which a cut is made.

What I claim is:

1. An instrument for use in measuring the cutting pressure exerted on a cutting tool and comprising in combination a tool holder, a carrier having a shank to be located in the tool post of a machine tool, the tool holder extending into the shank, a ball mounting one end of the tool holder for universal movement in the carrier, a resilient metal bar supported cantilever fashion by said carrier and reacting against the other end of the tool holder, and means to indicate deflection of the bar under the action of cutting pressure applied to a tool in the holder.

2. An instrument for use in measuring the cutting pressure exerted on a cutting tool and comprising in combination a tool holder, a carrier having a shank to be located in the tool post of a machine tool, the tool holder extending into the shank, a ball mounting one end of the tool holder for universal movement in the carrier, a resilient metal bar supported cantilever fashion by said carrier and reacting against the other end of the tool holder, a dial indicator on the carrier, and means to transmit movement of deflection of the bar to said indicator.

3. An instrument for use in measuring solely the tangential force exerted on a metal cutting tool, comprising a support, a tool holder, means supporting the holder for universal rocking movement in said support, two spaced knife-edge devices carried by said support, a resilient metal bar supported at its root end by said knife-edge devices, a third knife-edge device at the free end of the bar to establish engagement between the bar and the tool holder whereby movement of the holder under tangential cutting pressure is resisted cantilever fashion by the bar, a ball-ended strut disposed between the holder and the support to restrain the holder against movement in the direction of tool feed while still allowing the holder to move freely under the tangential cutting pressure and indicating means operated by the deflection of the bar.

4. An instrument as claimed in claim 3 and wherein the three knife-edge devices are disposed in a straight line parallel with the holder.

5. An instrument as claimed in claim 3 and wherein the third knife-edge device comprises two parts which are spaced apart transversely of the longitudinal center line of the tool holder.

6. An instrument for use in measuring solely the tangential cutting force exerted on a metal cutting tool, comprising a support, a tool holder, a ball mounting carried by the support and on which the holder is mounted at its end remote from its tool receiving end, two spaced knife-edge devices carried by said support, a resilient metal bar supported at its root end by said knife-edge devices, a third knife-edge device at the free end of the bar to establish engagement between the bar and the tool holder whereby movement of the holder under tangential cutting pressure is resisted cantilever fashion by the bar, a ball ended strut disposed between the holder and the support to restrain the holder against movement in the direction of tool feed while still allowing the holder to move freely under the tangential cutting pressure and indicating means operated by the deflection of the bar.

7. An instrument for use in measuring solely the tangential cutting force exerted on a metal cutting tool, comprising a support, a tool holder, a ball mounting carried by the support and on which the holder is mounted at its end remote from its tool receiving end, two spaced knife-edge devices carried by said support, a resilient metal bar supported at its root end by said knife-edge devices, a third knife-edge device at the free end of the bar to establish engagement between the bar and the tool holder whereby movement of the holder under tangential cutting pressure is resisted cantilever fashion by the bar, a ball-ended strut disposed between the holder and the support to restrain the holder against movement in the direction of tool feed while still allowing the holder to move freely under the tangential cutting pressure, spring means biasing the tool holder against the bar and against the strut, and indicating means operated by the deflection of the bar.

GEORG SCHLESINGER.

REFERENCES CITED

The following references are of record in the file of this patent:

UNITED STATES PATENTS

| Number | Name | Date |
|---|---|---|
| 1,637,676 | Von Bohuszewicz et al. | Aug. 2, 1927 |
| 2,112,252 | Sang | Mar. 29, 1938 |
| 2,329,541 | Kuehni | Sept. 14, 1943 |
| 2,360,639 | Asimow et al. | Oct. 17, 1944 |

FOREIGN PATENTS

| Number | Country | Date |
|---|---|---|
| 629,444 | France | July 26, 1927 |
| 662,098 | Germany | July 4, 1938 |